(12) United States Patent
Tüllmann et al.

(10) Patent No.: US 8,240,060 B2
(45) Date of Patent: Aug. 14, 2012

(54) METHODS AND APPARATUS FOR COMPENSATING TEMPERATURE-DEPENDENT CHANGES OF POSITIONS ON MACHINE TOOLS

(75) Inventors: Udo Tüllmann, Eisenach (DE); Christof Zenker, Holzkirchen (DE)

(73) Assignee: DECKEL MAHO Seebach GmbH, Seebach (DE)

( * ) Notice: Subject to any disclaimer, the term of this patent is extended or adjusted under 35 U.S.C. 154(b) by 0 days.

(21) Appl. No.: 13/070,290

(22) Filed: Mar. 23, 2011

(65) Prior Publication Data

US 2011/0232120 A1    Sep. 29, 2011

(30) Foreign Application Priority Data

Mar. 25, 2010    (DE) .......................... 10 2010 003 303

(51) Int. Cl.
   *G01B 5/00* (2006.01)
(52) U.S. Cl. ............................................. 33/702; 700/90
(58) Field of Classification Search ............ 33/701–704; 700/90, 193, 202, 205
   See application file for complete search history.

(56) References Cited

U.S. PATENT DOCUMENTS

| | | | |
|---|---|---|---|
| 4,728,232 A * | 3/1988 | Babel | 33/702 |
| 4,777,728 A * | 10/1988 | Ludicke | 33/702 |
| 6,167,634 B1 * | 1/2001 | Pahk et al. | 33/702 |
| 6,487,787 B1 * | 12/2002 | Nahum et al. | 33/706 |
| 7,266,903 B2 * | 9/2007 | Sato | 33/702 |
| 7,400,990 B2 * | 7/2008 | Strasser | 33/702 |
| 2006/0218811 A1 * | 10/2006 | Sato | 33/702 |
| 2011/0232120 A1 * | 9/2011 | Tullmann et al. | 33/701 |

FOREIGN PATENT DOCUMENTS

DE    198 00 033 A1    7/1999
DE    10 2004 044 838 A1    3/2006

* cited by examiner

*Primary Examiner* — Yaritza Guadalupe-McCall
(74) *Attorney, Agent, or Firm* — Hanley, Flight and Zimmerman, LLC (57) ABSTRACT

A disclosed example method for compensating a temperature-dependent change of position on a machine tool having at least one first linear axis involves detecting at least one first temperature at a first temperature measuring position of the first linear axis of the machine tool. The example method also involves obtaining a first difference in temperature between a first reference temperature and the first temperature and determining a first compensation value based on the first difference in temperature. In addition, the example method involves compensating a temperature-dependent change of position based on the first compensation value, the first compensation value is additionally determined based on an axis position of the first linear axis.

29 Claims, 6 Drawing Sheets

METHODS AND APPARATUS FOR COMPENSATING TEMPERATURE-DEPENDENT CHANGES OF POSITIONS ON MACHINE TOOLS

RELATED APPLICATIONS

This patent claims priority to German Patent Application No. 10 2010 003 303.0, filed on Mar. 25, 2010, which is hereby incorporated by reference herein in its entirety.

FIELD OF THE DISCLOSURE

The present disclosure relates generally to machine tools and, more particularly, to methods and apparatus for compensating temperature-dependent changes of positions on machine tools.

BACKGROUND

Thermal shifts on a machine tool are, for example, the results of warping of components, e.g., frame components, wherein such warping may be caused by heating and in particular by inhomogeneously heating the components, for example, by heat-input from guiding or driving members mounted on one side. When a frame component is heated by guides and drives on one side, the material will expand on this heated side in accordance with the one-sided heating. Due to the one-sided heating the frame component will have a larger length on the heated side than on the opposite side whereby the component will warp. Such behavior leads to a position error which is to be compensated by compensating during the control of the machine tool and the axes of a machine tool, respectively.

Generally, the above-described deformations of components of the machine tool are referred to as thermal growth of the machine tool. Machine tools exhibit this thermal growth due to the coefficient of thermal expansion. Thermal growth results on the one hand from linear thermal expansion, for example, of a slide or a machine bed of the machine tool. This portion of the linear thermal expansion results from a homogeneous rise of temperature of the component multiplied by the coefficient of thermal expansion.

However, a second portion of the thermal growth results via inhomogeneous differences in temperature that may occur on components of the machine tool. The cause of such differences in temperature may, e.g., be an uneven heat-input into the components of the machine tool. For example, if on a component of the machine tool the drives and guides are mounted to the bottom, this bottom will be heated more strongly and faster than the top of the component, e.g., a slide of a linear axis of the machine tool. Thus, this frequently leads to the situation that a frame component of a machine tool has a heated or quickly heating surface on which guides and drives are placed, and a cooler or more slowly and less strongly heating surface. Such one-sided heating results to warping of the component exposed to such inhomogeneous heating.

Regarding the above-described thermally caused shifts on a machine tool, it is known in the prior art to reduce or avoid the thermally caused shifts by actively tempering the machine tool and the components thereof. Thus, it is possible to use a medium that is brought to a predetermined temperature or a temperature guided in accordance with a set value by means of a cooling unit for locally tempering some or all components of the machine tools, in particular for cooling, e.g., the centers of heat production on a machine tool, such as, for example, spindles or drives.

Here, such approach by means of actively tempering or cooling some or all parts of a machine tool may be used effectively for reducing or avoiding the described changes of length of components in case of homogeneous heating. However, due to the locally limited input of the cooling agent it is not possible to fully prevent the generation of differences in temperature or it is even intensified in part so that the thermally caused deformations, which can be attributed to warping of the frame components in consequence of differences in temperature on different sides of the components of the machine tool, cannot be fully prevented by actively tempering the machine tool or are even intensified.

In this case, it is known in the prior art to compensate thermally caused shifts on a machine tool by measuring one or more temperatures on components of the machine tool and by calculating a compensation value correlative to the measured temperature in machine control by superimposing the axis target position. Here, it is known in the prior art to perform a control compensation wherein compensation values are calculated in dependence of the measured temperature(s) or difference(s) in temperature on components of the machine tool.

This may be done, e.g., by the following approach by a formula:

$$\Delta A1 = (T_{REFERENCE\_11} - T_{BASE\_11}) \cdot K\_11 + \quad (1)$$
$$(T_{REFERENCE\_12} - T_{BASE\_12}) \cdot K\_12 +$$
$$\ldots ++ (T_{REFERENCE\_1N} - T_{BASE\_1N}) \cdot K\_1N$$

$$\Delta AN = (T_{REFERENCE\_N1} - T_{BASE\_N1}) \cdot K\_N1 + \quad (2)$$
$$(T_{REFERENCE\_N2} - T_{BASE\_N2}) \cdot K\_N2 +$$
$$\ldots ++ (T_{REFERENCE\_NN} - T_{BASE\_NN}) \cdot K\_NN$$

Here, $\Delta A1$ is a correction value or compensation value for a first axis A1 of the machine tool, and $\Delta AN$ is a compensation value for an N-th axis AN of the machine tool. A reference temperature and a base temperature $T_{REFERENCE\_11}$ and $T_{BASE\_11}$ are detected on a component of the axis A1 of the machine tool and a corresponding difference in temperature is formed. Furthermore, a reference temperature and base temperature are each detected on other axes A1 to AN of the machine tool and a corresponding difference in temperature value is obtained.

In this course a compensation correction value is calculated for each of the axes, in particular the linear axes of the machine tool, which compensation correction value takes into consideration the differences in temperature, respectively multiplied by a compensation factor. K__11 to K__1N and K_N1 to K_NN are the respective compensation factors which are prefixed to the respective differences in temperature. These may be determined by simulation or experiments on the machine tool in order to be able to achieve a satisfying compensation result.

Here, it is preferred to superimpose or correct the target axis positions of the respective axes of the machine tool, which are predetermined in the machine control of an NC machine tool or CNC machine tool, by the calculated compensation correction values $\Delta A1$ or $\Delta AN$. For example, the target axis position of the axis A1 could be corrected by the calculated value $\Delta A1$ to compensate the thermal shift in the direction of the axis A1.

Similar methods for compensating temperature-dependent changes of position on a machine tool are known, for example, from DE 198 00 033 A1 or DE 10 2004 044838 A1.

However, such methods for compensating temperature-dependent changes of position on a machine tool are imprecise. In addition, it has been tried for a long time to further reduce the primary and secondary processing times (and thus the costs per piece) of machining on a machine tool by increasing the dynamics of the machine axes so that as a result thereof the thermally caused deviations increase with each machine generation having increased dynamics. In particular, thermal shifts on a machine tool thus become more relevant from one generation of machine tools to the next because the described thermally caused shifts increase with the dynamics of the machine tool, particularly because the friction in the drive and guiding members and the heating resulting therefrom increase with acceleration and above all with the maximum speed.

Moreover, machine tools generally have a plurality of axes serially based upon each other. This means that the thermal shifts of the individual axes add up toward the tool or workpiece and the thermoelastic shifts that act on the tool or workpiece result in dependence of all axes serially based upon each other. This exponentiates the occurring position errors.

In particular, a deviation of position due to thermal warping or thermal deformations may not only occur in the advancing direction (as is in the case of pure longitudinal expansion) of a linear axis, but further a deviation of position may occur perpendicular to the advancing direction. Especially in machines having large projections, that is, travel distances, large thermal growths result from these described effects, which account for a large part of the inaccuracies remaining on the workpiece. Particularly, inhomogeneous heating and warping of components that may be traced back thereto in case of the same temperature rise input on one side lead to distinctly larger thermal shifts (especially in another spatial direction) than the linear thermal expansion in case of homogeneous heating.

The inventors in the present application have carried out measurements wherein it was found that though the proportions of the deviation at a tool tip are merely within a range of −0.15 to 0.3 per mil as standardized relative to the work distance of the machine, after all this represents about −100 to 150 μm for a work distance of 500 mm, wherein these values do not satisfy today's requirements of machining accuracy of workpieces on a machine tool and have to be reduced or compensated.

DETAILED DESCRIPTION

In the following, disclosed examples are described in detail with reference to the attached Figures. However, the scope of coverage of this patent is not limited to the examples disclosed herein. To the contrary, this patent covers all methods, apparatus, systems, and articles of manufacture fairly falling within the scope of the claims either literally or under the doctrine of equivalents. In the Figures, same or similar features of the disclosed examples are denoted by the same reference numerals.

Example methods, apparatus, and systems disclosed herein relate to the balancing of thermal shifts on a machine tool using compensation by means of calculating compensation values that are calculated for a numerical or programmable logic control of the machine tool for compensating the thermal shifts.

Example methods and apparatus are disclosed for compensating temperature-dependent changes of positions on machine tools having at least one linear axis. In some examples, at least one temperature value is detected at a temperature measuring position of a linear axis of a machine tool, a difference in temperature value between a reference temperature and the detected temperature value is obtained, a compensation value is determined in dependence of the difference in temperature value, and a temperature-dependent change of position, for example, a temperature-dependent displacement of a tool or workpiece clamped onto the machine tool or of a component of the machine tool and of a linear axis, respectively, of the machine tool, is compensated in dependence of the determined compensation value when the machine tool is controlled.

Example systems are also disclosed. A disclosed example system comprises a machine tool, in particular an NC or CNC machine tool, having at least one linear axis and a device for compensating a temperature-dependent change of position on the machine tool.

Example methods disclosed herein for compensating temperature-dependent changes of position on a machine tool may be used to provide an improved method for compensating temperature-dependent changes of position on a machine tool with which it is possible to accomplish the compensation of the thermal shifts more efficiently and precisely than known techniques.

Examples disclosed herein include a method for compensating a temperature-dependent change of position on a machine tool having at least one first linear axis, a device for compensating a temperature-dependent change of position on a machine tool having at least one first linear axis and a system comprising a machine tool having at least one first linear axis and a device for compensating a temperature-dependent change of position on the machine tool according to disclosed example methods.

A disclosed example method for compensating a temperature-dependent change of position on a machine tool having at least one first linear axis comprises the steps of detecting at least one first temperature at a first temperature measuring position of the first linear axis of the machine tool, determining a first difference in temperature between a first reference temperature and the first temperature, determining a first compensation value in dependence of the first difference in temperature, and compensating a temperature-dependent change of position in dependence of the first compensation value. In some examples, the first compensation value is further determined in dependence of an axis position of the first linear axis. Thus, in such some examples, in the step of determining a first compensation value the first compensation value is determined both in dependence of the first difference in temperature and in dependence of the axis position of the first linear axis.

Thus, in some examples, the compensation of a temperature-dependent change of position is performed additionally in dependence of an axis position of a linear axis of the machine tool. This means that contrary to the prior art, in the present case the position of at least one or optionally a plurality of axes of the machine tool is taken into account in the calculation of compensation values for compensating the temperature-dependent changes of position on the machine tool. Particularly, this offers the advantage that the position-dependent thermal shifts of the individual axes that add up may also be compensated in a position-dependent manner, that is, adapted to the actual current position of the axis.

In this connection, the inventors particularly recognized that the thermal changes of position on a machine tool that may be caused by inhomogeneous heat-input and may entail the warping of components cause a position error that has a position-independent as well as a position-dependent portion, wherein the position-dependent position error cannot be taken into consideration in the compensation methods known from the prior art.

However, in some examples disclosed herein, which provide a position-dependent compensation of thermal shifts, the thermal shift at each axis position may be accurately compensated in an advantageous manner in dependence of the axis positions. Thus, examples disclosed herein can be used to calculate one compensation value or more compensation values not only in dependence of one or more measured temperatures and differences in temperature, respectively, as in the prior art, but additionally in dependence of one or more axis positions of the axes or linear axes of the machine tool that influence the position of the tool and/or workpiece. Here, the axis position of the one or more axes can be used to balance a position-dependent portion of the position error by a correspondingly calculated compensation value or more accurately balance it than in the compensation methods known in the prior art.

In some preferred examples, in this connection this position-dependent portion is also determined for directions perpendicular to the direction of movement of the linear axis where the difference in temperature was obtained. In some preferred examples, for machine tools having serial kinematics in which a plurality of axes are serially based upon each other the axis position of all axes serially based upon each other is taken into consideration. The respective axis positions of the axes of the machine tool can be read from a control unit of the machine tool, for example the so-called machine tool NC, and one or more compensation values depending on the axis position can be calculated in dependence of the axis position of the one or more axes of the machine tool, which compensation values can then be integrated in the control loop of the machine tool, for example for correcting axis target positions of the respective axes or for superimposing them according to the calculated one or more compensation values in order to compensate the thermal shifts of the components of the machine tool and the axes of the machine tool, respectively. Here, the compensation values may be calculated, e.g., in the machine NC or the machine PLC. Preferably, the positions of all axes of the machine tool are considered that contribute to the position of a tool or workpiece in a kinematic chain.

Furthermore, compensation values are preferably determined for several spatial directions, particularly preferably for all three spatial directions. Examples disclosed herein may be used to compensate a temperature-dependent shift on the machine tool in an improved manner than in the case of calculating compensation values without considering the axis position of the axes of the machine tool, because according to examples disclosed herein position-dependent thermal shifts may also be considered with a view to compensation whereby a strongly improved thermal compensation can be achieved. The thermal growth of the machine tool, particularly including the thermal growth due to inhomogeneously input heating and deformations or warping of components resulting therefrom can be successfully compensated in an improved manner.

Examples disclosed herein may be used to compensate a thermally caused shift of the machine axes using a correlative approach in which one or more compensation values are determined not only in dependence of one or more measured temperatures and obtained differences in temperature, respectively, but also in dependence of one or more axis positions of the axes of the machine tool which influence the position of the tool and/or workpiece.

In some preferred examples, the first compensation value comprises a position-independent portion and a position-dependent portion, wherein the position-dependent portion of the first compensation value preferably depends at least on the axis position of the first linear axis. This offers the advantage that both an axis position-independent and an axis position-dependent position error can be corrected or compensated by a corresponding position-independent and a position-dependent portion. Position-independent portions may develop, for example, from a linear expansion in case of uniform heating of a component in comparison to a comparison temperature.

In some preferred examples, the first compensation value is determined in dependence of the ratio of the axis position of the first linear axis to the axis length of the first linear axis. In order to be able to achieve even higher precision during the compensation of a temperature-dependent change of position, in some preferred examples the first compensation value may be determined in dependence of the square of the ratio of the axis position of the first linear axis to the axis length of the first linear axis. Thus, the position-dependent portion(s) of one or more compensation values may be determined in dependence of a simple ratio of the axis position of a linear axis to the axis length of a linear axis, that is, by a dimensionless parameter that is easy to handle. As the warping of a component substantially occurs as an arc, when a component has a temperature on one side different to the other side of the component, the position error, which depends on the axis position, is essentially not linear so that an even better compensation result can be obtained if a compensation value is not determined in dependence of the ratio of the axis position to the axis length of a linear axis but rather in dependence of the square of the ratio of the axis position to the axis length of the linear axis. However, as the warping is still within the range of linear approximation, the simple use of the ratio of the axis position to the axis length of a linear axis already is a good approximation and enables an excellent position-dependent compensation of temperature-dependent shifts on the machine tool.

In some preferred examples, in the step of compensating a temperature-dependent change of position in dependence of the first compensation value a temperature-dependent change of position is compensated in a direction perpendicular to the direction of the first linear axis. In the case of thermal deformation or shifts which can be traced back to warping and are generated due to inhomogeneous heating of components of the machine tool, it is another distinctive feature that a deviation of position is not caused in the advancing direction but perpendicular to the advancing direction, that is, different to a mere longitudinal expansion in the advancing direction of a linear axis. Thus, in this case an advantage is achieved in that the thermal shifts, which can be traced back to warping, can also be compensated advantageously and precisely in a direction perpendicular to the direction of a linear axis.

In some preferred examples, in the step of compensating a temperature-dependent change of position in dependence of the first compensation value, a temperature-dependent change of position is compensated in a direction of a second linear axis of the machine tool, the second linear axis being preferably disposed at right angles to the first linear axis. This makes it possible in an advantageous manner to compensate thermal shifts generated by inhomogeneously heating one or more components of the first linear axis in a direction of a second linear axis of the machine tool, for example by adapting an axis target position of the second linear axis for balancing a position error in the direction of the second linear axis.

In some preferred examples, the step of compensating a temperature-dependent change of position further comprises the step of adapting a first axis target position value of a second linear axis of the machine tool in dependence of the first compensation value, the adapting of the axis target position of the second linear axis being preferably performed in dependence of the axis position of the first linear axis. Thus, thermal shifts or position errors due to thermal shifts may be compensated by correcting or adapting the axis target position of a linear axis of the machine tool in dependence of the calculated compensation value so that the position error, which is caused by the thermal warping of the components of the first linear axis, can be compensated by the adapted axis target position of the second linear axis in the direction of the second linear axis.

The calculation of one compensation value or of a plurality of compensation values is performed in this case with a timing cycle as fast as possible in a control unit, for example, the so-called machine NC (NC for "numerical control"), or the programmable logic controller (PLC), also referred to as machine LC or machine PLC (PLC for "programmable logic controller"). Compensation values calculated in dependence of the position can then be superimposed by the control unit, the so-called machine NC, on the one or more axis target values of the linear axes of the machine tool. Furthermore, in order to compensate the thermally caused deformations by the (non-uniform) heating of the machine frame components, further compensation portions may be superimposed, for example, for compensating the shifts due to the motor spindle, on the compensation values.

Thus, example methods are disclosed in which the thermally caused shifts on a machine tool can be compensated preferably by measuring one or more temperatures on the machine tool and by calculating one or more compensation values correlative to the measured temperature in the machine control by superimposing the axis target positions in machine control or a position controller. In some preferred examples, the calculated compensation value(s) is/are used to correct axis target positions of the one or more linear axes of the machine tool in order to respectively compensate the temperature-dependent changes of position in the direction of the axes.

Some preferred example methods comprise the steps of detecting at least one second temperature at a third temperature measuring position of a second linear axis of the machine tool, obtaining a second difference in temperature between a second reference temperature and the second temperature, and determining a second compensation value in dependence of the second difference in temperature, wherein a temperature-dependent change of position is preferably compensated in dependence of the first compensation value and of the second compensation value, and wherein the second compensation value is further preferably determined in dependence of an axis position of the second linear axis. Thus, a thermal shift due to thermal expansion and deformation of one or more components of a second linear axis of the machine tool may advantageously also be compensated by obtaining a second difference in temperature. To this end, in some preferred examples, a second compensation value is determined in dependence of the axis position of the second linear axis so that both the axis position of the first and the axis position of the second linear axis are taken into account in the compensation of the temperature-dependent shifts and an even more optimum thermal compensation can be achieved.

In some preferred examples, the step of compensating a temperature-dependent change of position further comprises the steps of adapting a first axis target position value of the second linear axis of the machine tool in dependence of the first compensation value and/or adapting a second axis target position value of the first linear axis of the machine tool in dependence of the second compensation value, the adapting of the axis target position of the second linear axis being preferably performed in dependence of the axis position of the first linear axis and the adapting of the axis target position of the first linear axis being preferably performed in dependence of the axis position of the second linear axis. This makes it possible in an advantageous manner that the axis target position of the one linear axis can respectively be compensated in an advantageous manner in dependence of the axis position of the respective other linear axis so that deformations and shifts due to inhomogeneous heating of components, which cause position errors perpendicular to the advancing direction of one of the linear axes, can respectively be compensated or corrected by adapting the axis target position of the respective other linear axis.

In some preferred examples, the first reference temperature is a temperature measured at a second temperature measuring position of the first linear axis, and preferably, the second reference temperature is a temperature measured at a fourth temperature measuring position of the second linear axis. Alternatively, the second reference temperature may be equal to the first reference temperature, in particular equal to a uniform reference temperature detected at a reference temperature measuring position of the machine tool for two or more (or all) components of the machine tool. For example, the second reference temperature and the first reference temperature may be equal to a reference temperature depending on the ambient temperature of the machine tool. This makes it possible in an advantageous manner that, e.g., in the case of axes serially based upon each other at a second linear axis based upon the first linear axis, a compensation value is determined in dependence of the axis position of the first as well as in dependence of the axis position of the second linear axis. Thus, for the adaptation of the axis target positions of the second linear axis examples disclosed herein can be used to optimally compensate thermal shifts due to deformation of components of the first linear axis as well as thermal shifts due to deformation of components of the second linear axis. Further, if the second compensation value is also determined in dependence of an axis position of the first linear axis, respective compensation values can advantageously be determined for both linear axes in which the axis positions of both the first and the second linear axis may respectively be taken into consideration whereby an even more optimum thermal compensation is made possible.

In some preferred examples, the first and the second linear axes of the machine tool are realized as two axes serially based upon each other and including a projection on one side, the second linear axis being preferably based upon the first linear axis and the first compensation value further being preferably determined in dependence of an axis position of the second linear axis. In some preferred examples, the second compensation value is further determined in dependence of an axis position of the first linear axis.

Some preferred example methods comprise the steps of determining a third compensation value in dependence of the first difference in temperature, and/or determining a fourth compensation value in dependence of the second difference in temperature, a temperature-dependent change of position being compensated in a direction of the first linear axis preferably in dependence of the third compensation value and of the second compensation value, and a temperature-dependent change of position being preferably compensated in a direction of the second linear axis in dependence of the first compensation value and of the fourth compensation value, the third compensation value being further determined preferably in dependence of the axis position of the first linear axis and the fourth compensation value being further determined preferably in dependence of the axis position of the second linear axis. Thus, examples disclosed herein may be used to achieve an optimum thermal compensation in a machine tool having at least two axes serially based upon each other in which compensation values are calculated such that both a difference in temperature of one or more components of the first linear axis and a difference in temperature of one or more components of the second linear axis are taken into account and a plurality of compensation values is calculated where one or more axis positions of the linear axes are respectively taken into account and considered. This enables an excellent compensation of thermal shifts in a configuration of a machine tool in which the position of the tool and workpiece is determined by a plurality of axes serially based upon each other, for example, having an unchangeable projection on one side, in which the effects otherwise superimpose each other due to the structure serially based upon each other. Thus, it is possible to compensate effects in which thermal shifts not only result from the effects on a component but also from a superimposition of the temperature-dependent effects that may occur on all components. Here, in some preferred examples, a thermal shift at the tool or workpiece is preferably determined by a plurality of differences in temperature on the components of the axes and of the machine tool, respectively, in dependence of the axis position(s), preferably of the axis positions of all movement axes involved that contribute to the tool or workpiece position.

In some preferred examples, the step of compensating a temperature-dependent change of position further comprises the steps of adapting a first axis target position value of the second linear axis of the machine tool in dependence of the first compensation value and of the fourth compensation value and/or adapting a second axis target position value of the first linear axis of the machine tool in dependence of the third compensation value and of the second compensation value.

In some preferred examples, the machine tool comprises a plurality of linear axes serially based upon each other and having a projection, wherein for each of the plurality of linear axes at least one temperature is preferably obtained at a temperature measuring position of the linear axis and a respective difference in temperature between a respective reference temperature and the respective obtained temperature is obtained, and a compensation total value is determined preferably for each of the linear axes, which preferably corresponds to a sum of a plurality of compensation values the number of which is preferably equal to the number of the linear axes serially based upon each other, each individual compensation value being preferably directly proportional to exactly one of the differences in temperature. As an example, a seventh example to be described later is to be mentioned in which a general formula is stated for calculating compensation values for linear axes according to the above description.

Thus, examples disclosed herein may be used to advantageously perform a thermal compensation in which for each of a plurality of linear axes serially based upon each other a compensation total value is determined. In some preferred examples, the compensation total value corresponds to a sum of compensation values that respectively is directly proportional to one of the differences in temperature at one of the axes so that the compensation total value corresponds to a sum of compensation values in which each compensation value linearly depends on another difference in temperature of another linear axis so that for each compensation total value all differences in temperature of all linear axes may be taken into account.

In this case, of course, the respective compensation values are determined dependent on the position in accordance with disclosed examples and depend on at least one axis position of one of the linear axes, optionally also on more or even all linear axis positions of the linear axes serially based upon each other. In this connection, a particularly general formula will be described later in detail with respect to the sixth or seventh examples described below. In some preferred examples, each compensation value is formed in dependence of a sum of position-dependent terms, each position-dependent term preferably depending on the axis position of at least one of the linear axes. In some preferred examples, each one of the position-dependent terms depends on the ratio of the axis position to the axis length of at least one of the linear axes. In some preferred examples, each compensation value comprises a position-dependent term for the linear axis, to the difference in temperature of which the compensation value is directly proportional. Moreover, in some preferred examples, each compensation value comprises position-dependent terms at least for all preceding linear axes of the plurality of linear axes serially based upon each other.

When the first linear axis is a slide displaceable on a machine bed, the first compensation value is further preferably determined such that another factor (AP1−AL1/2)/(AL1/2) is taken into account, AP1 indicating the axis position of the first linear axis and AL1 indicating the axis length of the first linear axis. Thus, the position-dependent thermal compensation of thermal shifts on the machine tool may also be applied to linear axes in which a displaceable slide is disposed on a machine bed, wherein the machine bed may optionally be curved or bent by thermal deformation. In order to provide an advantageous compensation of the thermal shifts in a manner adapted to the linear axis having the displaceable slide on the machine bed, another factor will be used in this case which ensures that the calculated compensation values for compensating the thermal shifts, for example at a central position of the displaceable slide on the machine bed, are minimal.

In some preferred examples, the step of determining one or more compensation values is carried out in a position controller of a numerical control device of the machine tool or in a programmable logic controller of the machine tool. Furthermore, in some preferred examples, the step of compensating a temperature-dependent change of position is carried out in dependence of the one or more compensation values in the numerical control device of the machine tool. The calculation of the position-dependent compensation values must be performed at a timing cycle as fast as possible in the machine control of the machine tool for which a calculation of the compensation values is suggested in the machine control unit, the so-called machine tool NC, in a position controller cycle.

Alternatively, a calculation may further be made in the machine tool PLC (in the PLC, i.e. the programmable logic controller of the machine tool). In this case, the compensation values would no longer be calculated synchronously to the position controller cycle so that fast displacement movements of the machine might lead to a "leading" or "trailing" of the compensation values due to the position-dependent terms. Therefore, the calculation of the compensation values in the control unit (i.e. the machine NC, are an advantage, however, the trailing or leading effects are small as long as the PLC cycle is not significantly slower than the position controller cycle of the machine control. If, for example, the PLC cycle with 4 ms is slower by the factor 4 than the NC position controller cycle with e.g. 1 ms, as in many machine controls, the machine axis or the machine axes cannot travel more than 6.7 mm in 4 ms even at an extraordinarily high maximum advancing speed of up to 100 m per minute. However, in case of a total axis length of 500 mm this only leads to an error in the position-dependent compensation value of 1.3% maximum via the position-dependent term of axis position to axis length so that the errors caused by a calculation of the compensation values in the machine PLC may be neglected due to the lower speed of the PLC as compared to the NC.

Furthermore, as described below, an example device for compensating a temperature-dependent change of position on a machine tool having at least one linear axis is disclosed which is adapted to perform a method for compensating a temperature-dependent change of position on the machine tool according to at least one of the example methods described above and example preferred methods, respectively. In this connection, substantially the means will be described below which are set up to perform the steps of the above-described methods or example preferred aspects thereof.

In some examples, a device for compensating a temperature-dependent change of position on a machine tool having at least one linear axis according to at least one of the above-described methods is also disclosed. The device comprises first temperature detecting means for detecting at least one first temperature at the first temperature measuring position of a first linear axis of the machine tool, difference in temperature obtaining means for obtaining a first difference in temperature between a first reference temperature and the first temperature, compensation value determining means for determining a first compensation value in dependence of the first difference in temperature, and change of position compensating means for compensating a temperature-dependent change of position in dependence of the first compensation value. According to examples disclosed herein, the change of position compensating means is set up to further determine the first compensation value in dependence of an axis position of the first linear axis.

In some preferred examples, the change of position compensating means further comprises axis target position adapting means for adapting a first axis target position value of a second linear axis of the machine tool in dependence of the first compensation value (optionally further for adapting further axis target position values of further linear axes of the machine tool in dependence of one or more of the compensation values determined by the compensation value determining means), the axis target position adapting means being preferably set up to perform the adapting of the axis target position of the second linear axis in dependence of the axis position of the first linear axis. Furthermore, in some preferred examples, the axis target position adapting means is set up to perform the adapting of a respective axis target position of a plurality of linear axes of the machine tool in dependence of the axis position of a plurality of linear axes of the machine tool, optionally in dependence of the axis position of all linear axes of the machine tool.

In some preferred examples, an example device further comprises second temperature detecting means for detecting at least one second temperature at a third temperature measuring position of a second linear axis of the machine tool, the second difference in temperature obtaining means being preferably further set up to obtain a second difference in temperature between a second reference temperature and the second temperature, and the change of position compensating means being preferably further set up to determine a second compensation value in dependence of the second difference in temperature, and to preferably compensate a temperature-dependent change of position in dependence of the first compensation value and of the second compensation value, wherein the second compensation value is further determined preferably in dependence of an axis position of the second linear axis.

In some preferred examples, the example device further comprises third temperature detecting means for detecting the first reference temperature at a second temperature measuring position of the first linear axis and/or fourth temperature detecting means for detecting the second reference temperature at a fourth temperature measuring position of the first linear axis.

In some preferred examples, the compensation value determining means for determining one or more compensation values is comprised in a position controller of a numerical control device of the machine tool or in a programmable logic controller of the machine tool. In some preferred examples, the change of position compensating means for compensating a temperature-dependent change of position in dependence of the one or more compensation values is comprised in the numerical control device of the machine tool.

In accordance with examples disclosed herein, a system comprising a machine tool having at least one first linear axis and one of the above-described devices for compensating a temperature-dependent change of position on the machine tool is provided in accordance with one of the above-described example methods.

In accordance with examples disclosed herein, example methods and devices for compensating a temperature-dependent change of position on a machine tool having at least one linear axis are disclosed which makes it possible to perform an improved compensation method as compared to the prior art for compensating the temperature-dependent changes of position on the machine tool because in addition to obtained differences in temperature on components of the linear axes or the machine tool, a position-dependent portion is additionally obtained in dependence of one or more axis positions of the one or more linear axes of the machine tool so that the compensation can be performed additionally in dependence of the position in an improved manner as compared to the prior art.

Figure 1:
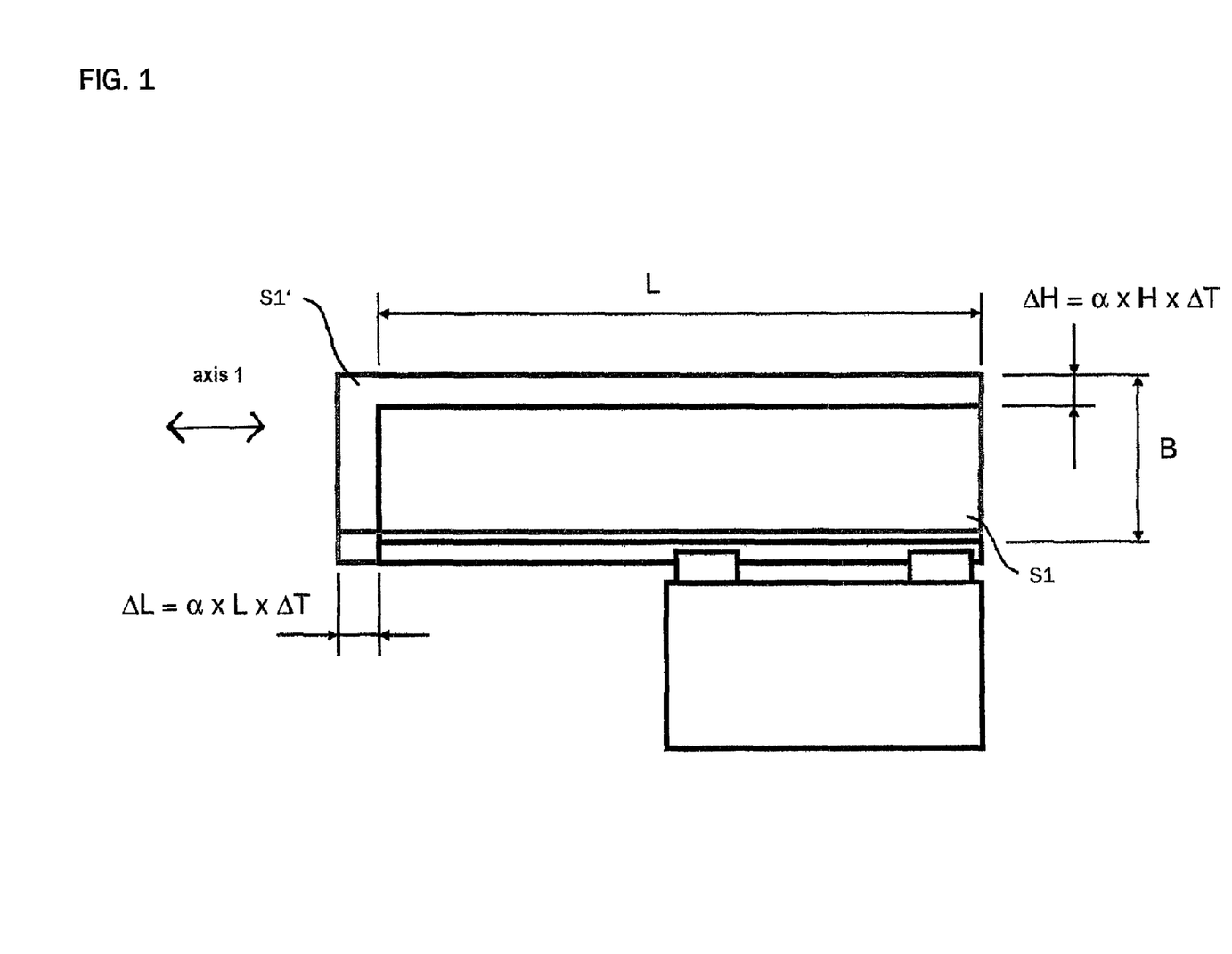
FIG. 1 schematically shows a displaceable slide of a first linear axis of a machine tool under the influence of homogeneous heating and a linear thermal expansion resulting therefrom.

FIG. 1 shows a slide S1 of a first linear axis A1 of a machine tool, which can be displaced in the direction of the part "axis 1" and has a length L and a height H. In case of homogeneous heating or a change in temperature the slide S1 is expanded linearly (S1 in this connection denotes the slide in an unexpanded situation, i.e., for example in case of a particular reference or base temperature, and S1' denotes the slide in an expanded situation), wherein the change of height and the change of length, respectively, are calculated as follows:

$$\Delta L = \alpha \cdot L \cdot \Delta T \quad (3)$$

$$\Delta H = \alpha \cdot H \cdot \Delta T \quad (4)$$

$\Delta L$ describes the change of length in case of uniform heating by the change in temperature $\Delta T$, and $\alpha$ describes the coefficient of thermal expansion of the material of the slide S1. $\Delta H$ describes the change of height of the slide S1 in case of homogeneous heating or a rise of temperature by the amount $\Delta T$, and $\alpha$ is the coefficient of thermal expansion of the material of the slide S1.

Thus, thermal growth results due to homogeneous heating by the amount $\Delta T$ through linear thermal expansion of a slide or of a machine bed of a machine tool, this portion of the linear thermal expansion resulting from the rise of temperature $\Delta T$ of a component, multiplied by the coefficient of thermal expansion $\alpha$.

Another portion of the thermal growth results via differences in temperature of components, for example through non-uniform heat-input into the components of the machine tool. As already described above, e.g., drives and guides are generally attached to the bottom surface of a component so that this bottom surface may heat more strongly and faster than the top surface of a component, for example, a slide of a machine tool, so that one-sided heating or inhomogeneous heating of the component results which leads to warping of the component, as schematically shown, e.g., in FIG. 2.

Figure 2:
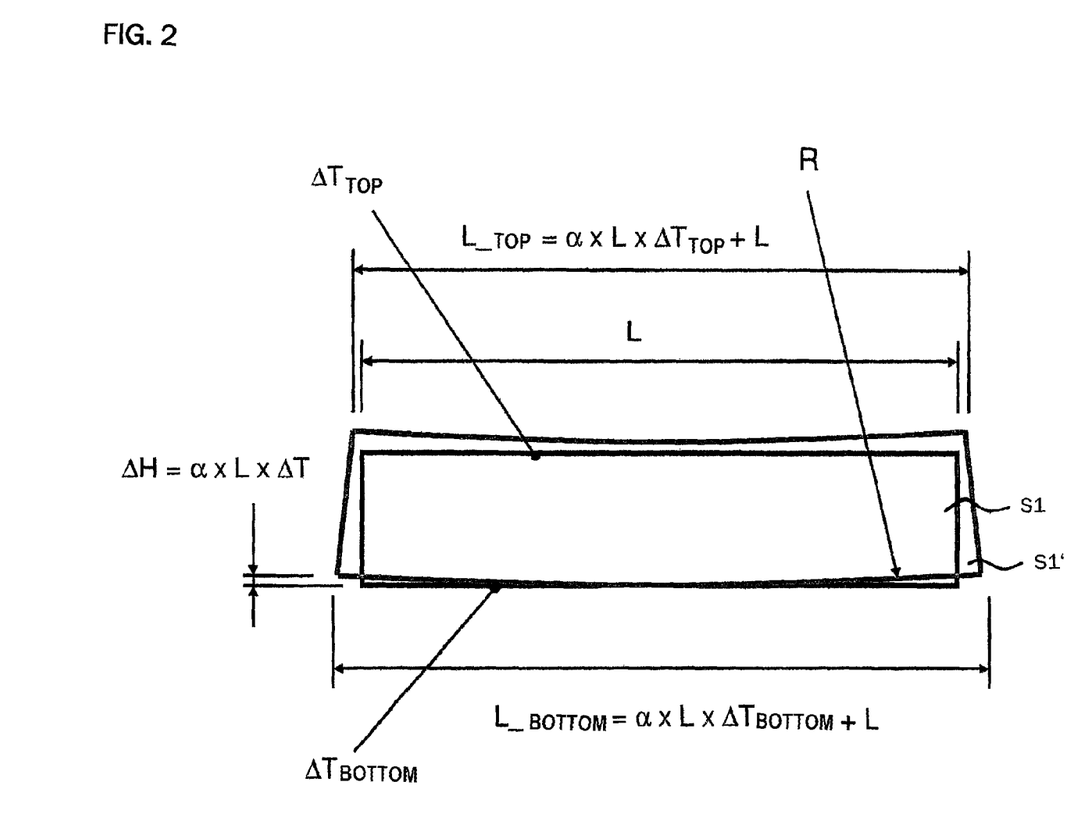
FIG. 2 schematically shows a warping deformation of a component of a machine tool, e.g., of a slide, under the influence of inhomogeneous heating.

Due to the different heating on the top surface and bottom surface of the components, described by the changes in temperature $\Delta T_{TOP}$ und $\Delta T_{BOTTOM}$, a non-uniform expansion of the top and bottom surfaces of the slide S1 results in the longitudinal direction of the slide S1 so that warping will occur, as shown in FIG. 2.

In this connection, the length at the top surface of the slide S1 results as follows:

$$L_{TOP} = L + \alpha \cdot L \cdot \Delta T_{TOP} \quad (5)$$

The length of the bottom surface of the slide S1 after a change of temperature results as follows:

$$L_{BOTTOM} = L + \alpha \cdot L \cdot \Delta T_{BOTTOM} \quad (6)$$

The warping of the slide S1 may be described by a radius R, as shown in FIG. 2, wherein the following relation applies:

$$R/L_{BOTTOM} = (R-H)/L_{TOP} \quad (7)$$

This can be solved for the radius R as follows:

$$R = H \cdot L_{BOTTOM}/(L_{BOTTOM} - L_{TOP}) \quad (8)$$

Figure 3:
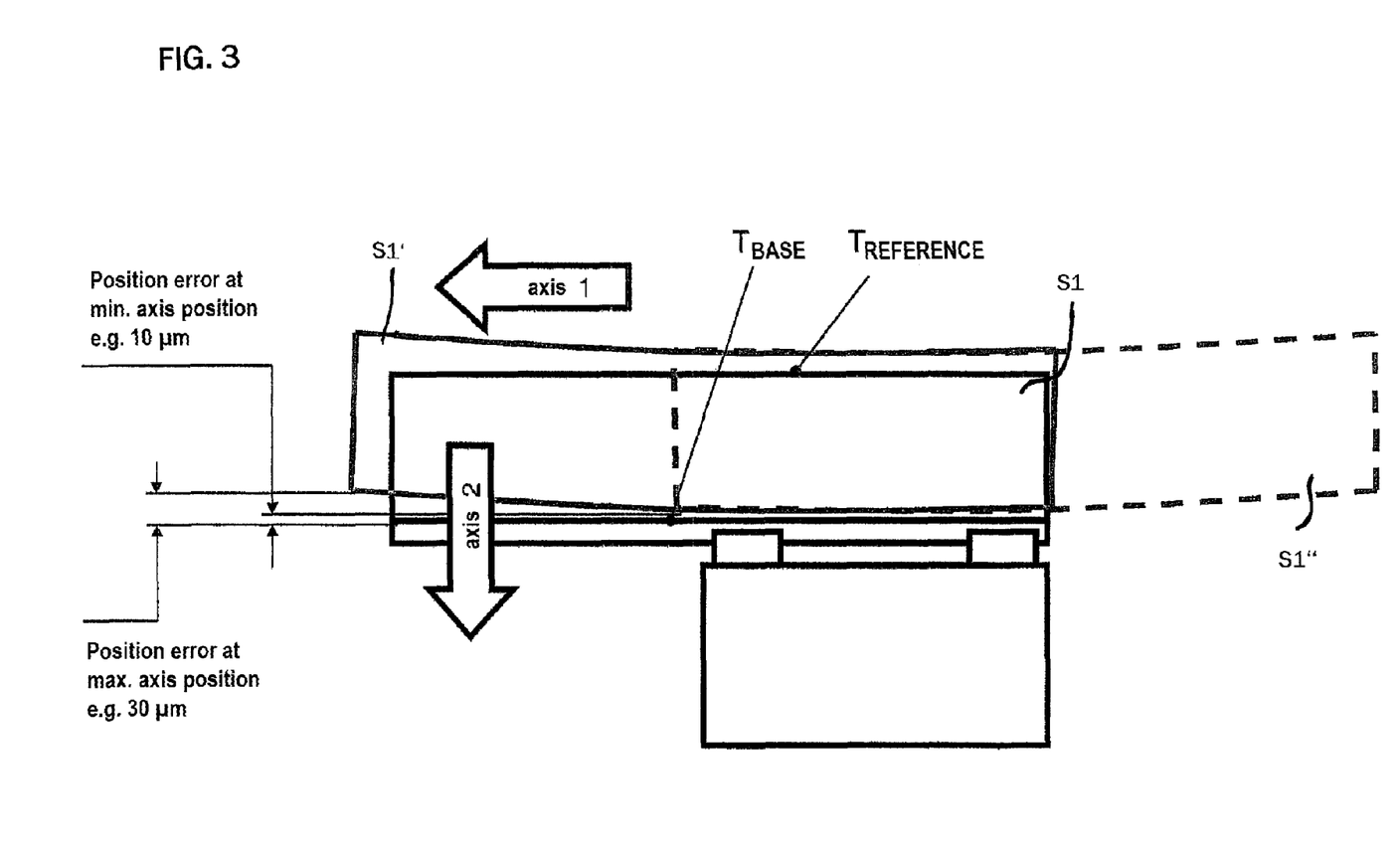
FIG. 3 illustrates a position-dependent position error of a slide of a first linear axis of a machine tool during a temperature-dependent deformation in case of inhomogeneous heating.

However, in this method such deformed slide S1 no longer performs a linear movement in the direction of the linear axis "axis 1" on the machine tool but travels in an arcuate motion, as shown, for example, in FIG. 3. Thus, the thermal displacement or the thermal position error has a portion in a direction perpendicular to the first linear axis (direction of arrow "axis 1"), that is, in the direction of the second linear axis (direction of arrow "axis 2") from a basic value which depends on the position (here 10 µm, as an example) and a value dependent on the slide position, the position error having 10 µm as an example in case of a minimum axis position, that is, in case a ratio of the axis position to the axis length is zero, and the position error having 30 µm, that is, the maximum position error, as an example in case of a maximum axis position, that is, in case a ratio of the axis position to the axis length is 1.

In the first example described below a description is given of how such deformation of a slide S1 may be successfully compensated according to examples disclosed herein.

FIRST EXAMPLE

According to examples disclosed herein the thermally caused displacement of the machine axes is compensated by a correlative approach, wherein a compensation value is determined not only in dependence of a measured temperature, but also in dependence of an axis position of an axis that influences the position of the tool and/or workpiece.

According to the thermally deformed slide S1, described in FIG. 3, of a first linear axis A1 that can displace the slide S1 in the direction of the arrow "axis 1", it is not compellingly required to determine a position-dependent compensation in the direction of the first linear axis because the deformation of the slide mainly results in the direction of the axis perpendicular to the first linear axis A1 (direction of arrow "axis 2") (in FIG. 3 S1 denotes the slide in a non-deformed situation, that is, at $T_{REFERENCE} = T_{BASE}$, S1' denotes the slide deformed in dependence of the temperature at a displacement position at axis position(A1)/axis length(A1)=1, and S1" denotes the slide deformed in dependence of the temperature at a displacement position at axis position(A1)/axis length(A1)=0).

Thus, a compensation value, $\Delta A1$ for compensation in the direction of the axis 1 can be calculated as follows:

$$\Delta A1 = (T_{REFERENCE} - T_{BASE}) \cdot K\_11 \quad (9)$$

This corresponds to the method according to the prior art because merely a compensation factor $K\_11$ and a difference in temperature $T_{REFERENCE} - T_{BASE}$ are taken into account in the calculation of the compensation value $\Delta A1$, the difference in temperature $T_{REFERENCE} - T_{BASE}$ describing a difference in temperature between the top surface and the bottom surface of the slide S1 in FIG. 3.

However, as the position error in a perpendicular direction to the first linear axis A1 depends upon the position due to the thermal deformation of the slide S1, it is preferred in this situation to carry out a compensation by means of calculating a position-dependent compensation value according to examples disclosed herein. In this connection, according to the first example, a compensation value $\Delta A2$ is calculated as follows for compensating a first position error due to the thermal displacement in the direction of the second linear axis A2 which, for example, is perpendicular to the first linear axis A1:

$$\Delta A2 = (T_{REFERENCE} - T_{BASE}) \cdot [K\_21 + K\_22 \cdot (\text{axis position}(A1)/\text{axis length}(A1))] \quad (10)$$

Here again the calculation of the compensation value depends on the difference in temperature $T_{REFERENCE} - T_{BASE}$. Furthermore, for the calculation of the compensation value $\Delta A2$ a ratio of the axis position of the first linear axis A1 to the axis length of the first linear axis A1 is calculated and, weighted by a compensation factor $K\_22$, is taken into account in the calculation of the compensation value $\Delta A2$. Moreover, a position-independent portion of the compensation value $\Delta A2$ is made possible by the additional compensation factor $K\_21$. Thus, the position deviation shown in FIG. 3 can be successfully compensated by taking into consideration the axis position of the first linear axis A1, that is, of that axis which displaces the slide S1 in the direction of the arrow "axis 1".

SECOND EXAMPLE

As can be seen in FIG. 3, the slide S1 performs an arcuate motion due to the thermal warping when it is displaced in the direction of the arrow "axis 1". Thus, examples disclosed herein may be used to further increase the accuracy of the compensation of the first example described above by linearly not taking into account the ratio of the axis position of the first axis A1 to the axis length of the first axis A1 in the position-dependent term of the compensation value ΔA2, but the square of this ratio so that the improved compensation is calculated according to the following formulas (11) and (12):

$$\Delta A1 = (T_{REFERENCE} - T_{BASE}) \cdot K\_11 \quad (11)$$

$$\Delta A2 = (T_{REFERENCE} - T_{BASE}) \cdot [K\_21 + K\_22 \cdot (\text{axis position}(A1)/\text{axis length}(A1))^2] \quad (12)$$

After the calculation of the compensation value ΔA2 according to the first or the second examples the thermal displacement can be compensated based on the calculated compensation value ΔA2 by superimposing this value to a target axis position of a second axis, which displaces, e.g., a workpiece in the direction of the arrow "axis 2", and correcting it, respectively, in accordance with the calculated compensation value ΔA2. Preferably, this is done in machine control, for example, in the machine tool NC.

THIRD EXAMPLE

If the position of the tool and workpiece is determined by a plurality of axes based upon each other and having a one-sided and changeable projection, as in many known machine tools, the effects of the deformations of the components of the axes serially based upon each other will superimpose each other.

Thus, the thermal displacement results not only through effects on a component of an axis, but through the superimposition of the effects that occur at all components of the axes involved. In particular, the thermal displacement at the tool or workpiece is determined by differences in temperature at the components in dependence of the axis positions of all movement axes involved that contribute to the tool or workpiece position.

Figure 4A:
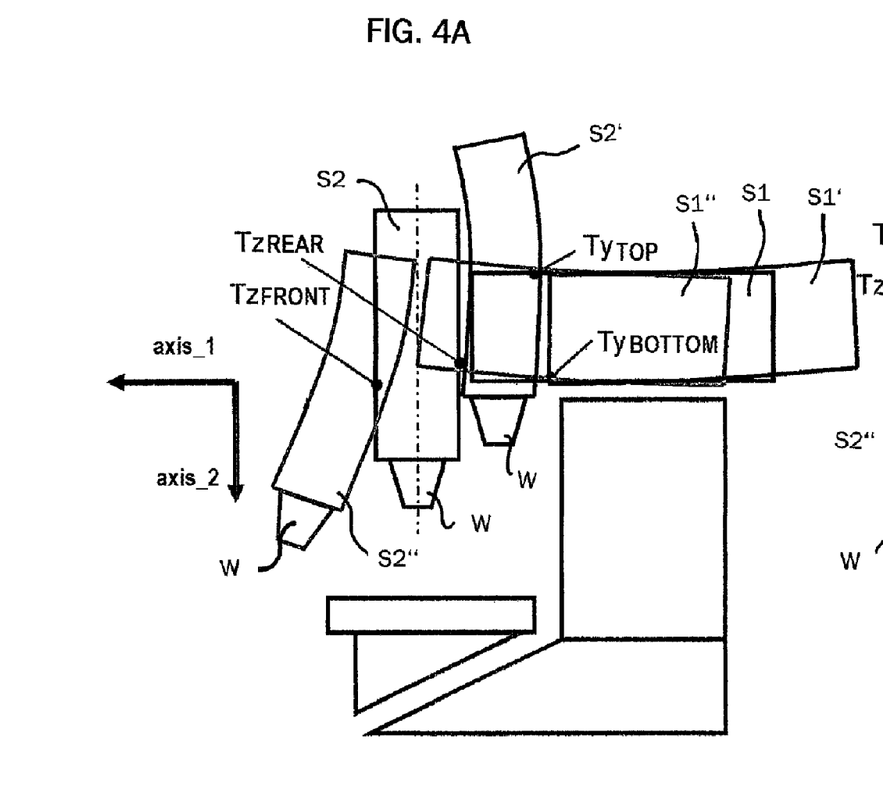
FIG. 4A and FIG. 4B show the thermal deformation in case of inhomogeneous heating of components of two linear axes serially based upon each other of a machine tool.
Figure 4B:
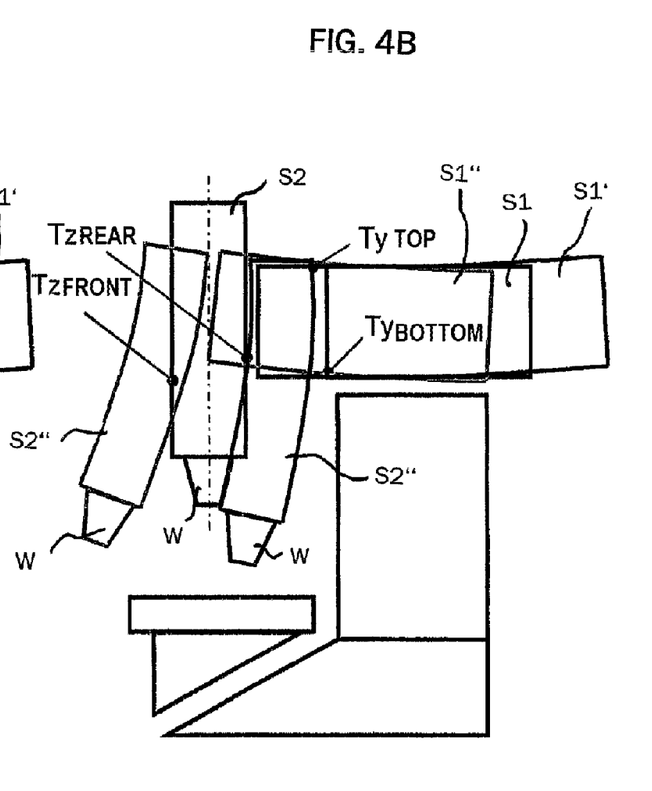

With respect to a third example, two linear axes A1 and A2 serially based upon each other, as illustrated by way of example in FIG. 4A and FIG. 4B, are discussed as an example wherein a displaceable component S2 of the second linear axis A2 of the machine tool is displaceably disposed on a displaceable component S1 of the first linear axis A1 of the machine tool. Here, the component S1 of the first linear axis A1 can be displaced in the direction of the arrow "axis 1", and the component S2 of the second linear axis can be displaced in the direction of the arrow "axis 2".

At each of the components S1 and S2 a temperature is detected at a first measuring position on one side of the respective component and a temperature is detected at a second measuring position on an opposite side of the respective component wherein differences in temperature are determined from the obtained temperature values on opposite sides of the respective components. However, the examples disclosed herein are not limited to the fact that two temperature values are measured on one axis. Rather, examples disclosed herein may be used in instances in which a base temperature is detected for a plurality of axes (for example an ambient temperature) and only one temperature is detected on each axis in order to obtain a respective difference in temperature to the base temperature. Likewise, disclosed examples may be used to detect more than two temperatures at one axis.

FIG. 4A and FIG. 4B show by way of example that on the component S1 of the first linear axis A1 a temperature value $T_{Y,TOP}$ is detected on the top surface and a temperature measurement value $T_{Y,BOTTOM}$ is detected on the bottom surface from which a difference in temperature $T_{Y,BOTTOM} - T_{Y,TOP}$ is obtained which indicates inhomogeneous heating between the top and bottom surfaces of the component S1 of the first linear axis A1. In analogy a temperature measurement value $T_{Z,REAR}$ is detected on the rear surface and a temperature measurement value $T_{Z,FRONT}$ is detected on the front surface of the component S2 of the linear axis A2, from which a difference in temperature $T_{Z,REAR} - T_{Z,FRONT}$ is determined which indicates inhomogeneous heating of the component S2 of the second linear axis A2.

As shown in FIG. 4A and FIG. 4B, such difference in temperature on the component S1 of the first linear axis A1 and the component S2 of the second linear axis A2, respectively, leads to warping or a thermal deformation of the respective components, which upon displacement of the respective axes A1 and A2 in the direction of the arrows "axis 1" and "axis 2" leads to thermal shifts of the tool optionally clamped in a tool holding device W.

In FIG. 4A and FIG. 4B, S1 denotes a component of the first linear axis A1 in a non-warped situation, that is, at $T_{Y,BOTTOM} = T_{Y,TOP}$, S1' denotes the component of the first linear axis A1 warped in an example manner in dependence of the temperature in a displacement position at axis position (A1)/axis length(A1))=0, and S1" denotes the component of the first linear axis A1 warped in an example manner in dependence of the temperature in a displacement position at axis position(A1)/axis length(A1))=1. In FIG. 4A and FIG. 4B, S2 denotes a component of the second linear axis A2 in a non-warped situation, that is, at $T_{Z,REAR} = T_{Z,FRONT}$, S2' denotes the component of the second linear axis A2 warped in an example manner in dependence of the temperature in a displacement position at axis position(A2)/axis length (A2))=0, and S2" denotes the component of the second linear axis A2 warped in an example manner in dependence of the temperature in a displacement position at axis position(A2)/ axis length(A2))=1.

According to the third example, a compensation value ΔA1 is obtained for the axis A1 and a compensation value ΔA2 is obtained for the axis A2, respectively, as stated in the following formulas (13) and (14), which can be used for correcting or superimposing the axis target positions of the axes A1 and A2, as in the above-described examples, in order to compensate the thermal displacement of the tool on the tool holding device W.

$$\Delta A1 = (T_{Y,BOTTOM} - T_{Y,TOP}) \cdot \\ [K\_110 + K\_111 \cdot (\text{axis position }(A1)/\text{axis length }(A1))] + + \\ (T_{Z,REAR} - T_{Z,FRONT}) \cdot \\ [K\_120 + K\_122 \cdot (\text{axis position }(A2)/\text{axis length }(A2))] \quad (13)$$

-continued $$\Delta A2 = (T_{Y,BOTTOM} - T_{Y,TOP}) \cdot \quad (14)$$
$$[K\_210 + K\_211 \cdot (\text{axis position } (A1)/\text{axis length } (A1))] ++$$
$$(T_{Z,REAR} - T_{Z,FRONT}) \cdot$$
$$[K\_220 + K\_222 \cdot (\text{axis position } (A2)/\text{axis length } (A2))]$$

In this connection, according to the first example, each one of the compensation values ΔA1 and ΔA2 is formed from a sum in which a first summand is directly proportional to the difference in temperature of the first linear axis A1, that is, directly proportional to $T_{Y,BOTTOM}-T_{Y,TOP}$, and the second summand is directly proportional to the obtained difference in temperature on the component S2 of the second linear axis A2, that is, directly proportional to the difference in temperature $T_{Z,REAR}-T_{Z,FRONT}$.

Furthermore, each of the summands contains a position-independent portion which is indicated by the compensation factors K__110 and K__120 in the compensation value ΔA1, and a position-dependent portion which is normalized by the compensation factors K__111 and K__122. In the compensation value ΔA2 for the second linear axis A2 the corresponding compensation factors for the position-independent portion are indicated by K__210 and K__220, and the respective position-dependent portions are normalized by the compensation factors K__211 and K__222.

Furthermore, each position-dependent portion contains a ratio of an axis position to an axis length. In this connection the summand which is directly proportional to the difference in temperature of the first linear axis A1, for example, the dependence of the axis position of the first linear axis A1, and the summand which is directly proportional to the second difference in temperature of the second linear axis A2, for example, the dependence of the axis position of the second linear axis A2. As can be seen by means of the equations (13) and (14), in this case the dimensionless parameter of the ratio of the axis position to the axis length has been selected by way of example. As described above in connection with the second example, the square of the ratio of the axis position to the axis length may be used to further improve the thermal compensation of temperature-dependent shifts. Furthermore, the formulas (13) and (14) may also be used advantageously for axes not serially based upon each other.

FOURTH EXAMPLE

A further improved compensation of thermal shifts results in axes serially based upon each other according to this fourth example. In the above-described third example, the compensation values ΔA1 and ΔA2 were respectively calculated for the first linear axis A1 and the second linear axis A2 such that summands were formed in which factors proportional to the difference in temperature of the first linear axis A1 had a position dependency to the axis position of the first linear axis A1 and terms that are directly proportional to the second difference in temperature of the second linear axis A2 had a position dependency with respect to the axis position of the second linear axis.

However, a further improved compensation of temperature-dependent shifts may be determined and/or implemented in that in the terms that are directly proportional to the difference in temperature of the first linear axis A1, that is, directly proportional to the difference in temperature $T_{Y,BOTTOM}-T_{Y,TOP}$, the axis position of the second linear axis A2 is further taken into consideration by means of another compensation factor K__112 for the compensation value ΔA1. Also in the term that is directly proportional to the difference in temperature of the first linear axis A1 it is possible to consider both the axis position of the first linear axis A1 with a compensation factor K__211 and the axis position of the second linear axis A2 by means of the compensation factor K__212 for the calculation of the compensation value ΔA2.

This is stated in the following formulas (15) and (16):

$$\Delta A1 = (T_{Y,BOTTOM} - T_{Y,TOP}) \cdot \quad (15)$$
$$[K\_110 + K\_111 \cdot (\text{axis position } (A1)/\text{axis length } (A1)) ++$$
$$K\_112 \cdot (\text{axis position } (A2)/\text{axis length } (A2))] ++$$
$$(T_{Z,REAR} - T_{Z,FRONT}) \cdot [K\_120 +$$
$$K\_122 \cdot (\text{axis position } (A2)/\text{axis length } (A2))]$$

$$\Delta A2 = (T_{Y,BOTTOM} - T_{Y,TOP}) \cdot \quad (16)$$
$$[K\_210 + K\_211 \cdot (\text{axis position } (A1)/\text{axis length } (A1)) ++$$
$$K\_212 \cdot (\text{axis position } (A2)/\text{axis length } (A2))] ++$$
$$(T_{Z,REAR} - T_{Z,FRONT}) \cdot [K\_220 +$$
$$K\_222 \cdot (\text{axis position } (A2)/\text{axis length } (A2))]$$

Thus, a temperature-dependent displacement is compensated by the fact that for terms proportional to a difference in temperature of a particular axis from a plurality of axes serially based upon each other not only the axis position of this particular axis, but also the axis positions of the following axes based upon this particular axis are taken into consideration.

This may improve the compensation even further because even in a situation in which the difference in temperature $T_{Z,REAR}-T_{Z,FRONT}$ equals zero—so the component S2 of the second linear axis A2 is not deformed—the workpiece is still displaced because of an inclination due to a deformation of the component S1 which displacement can depend upon the axis position of the second linear axis A2.

For example, in the undeformed state of all components of the linear axes A1 and A2 no displacement of the workpiece will occur in the direction of the arrow "axis 1" by a displacement of the component S2 of the second linear axis A2. However, if only a component S1 of the first linear axis A1 is deformed, which may lead to an inclination of the linear axis A2, a change of position of the component S2 may still result in a displacement of the workpiece in the direction of the arrow "axis 1" so that an improved temperature-dependent displacement compensation may be achieved when the position dependency of the axis position of the second axis A2 is also taken into account in the term that depends on the difference in temperature of the first component S1 of the first linear axis A1.

FIFTH EXAMPLE

In order to further improve the thermal compensation of the temperature-dependent shifts of the tool or of the workpiece, in accordance with a fifth example, for each of the two linear axes A1 and A2 serially based upon each other from FIG. 4 compensation values ΔA1 and ΔA2 are calculated that each comprise two summands, each of these summands being directly proportional to one of the differences in temperature and the axis position of each of the two axes A1 and A2 being taken into account in each of these summands.

For this purpose, as described in the following equations (17) and (18), all in all the compensation factors K__110, K__120, K__210, and K__220 are used for the respective position-independent portions and other compensation factors K__111, K__112, K__121, K__122, K__211, K__212, K__221, and K_222 are used for the position-dependent portions. These compensation factors may be determined, for example, by simulation or experiment, and their magnitude depends on the effect of the respective terms. Particularly, one or more of the terms could be zero or approximately zero if the term hardly contributes to the thermal displacement or does not contribute thereto at all.

$$\Delta A1 = (T_{Y,BOTTOM} - T_{Y,TOP}) \cdot \\ [K\_110 + K\_111 \cdot (\text{axis position } (A1)/\text{axis length } (A1)) ++ \\ K\_112 \cdot (\text{axis position } (A2)/\text{axis length } (A2))] ++ \\ (T_{Z,REAR} - T_{Z,FRONT}) \cdot [K\_120 + \\ K\_121 \cdot (\text{axis position } (A1)/\text{axis length } (A1)) ++ \\ K\_122 \cdot (\text{axis position } (A2)/\text{axis length } (A2))] \quad (17)$$

$$\Delta A2 = (T_{Y,BOTTOM} - T_{Y,TOP}) \cdot \\ [K\_210 + K\_211 \cdot (\text{axis position } (A1)/\text{axis length } (A1)) ++ \\ K\_212 \cdot (\text{axis position } (A2)/\text{axis length } (A2))] ++ \\ (T_{Z,REAR} - T_{Z,FRONT}) \cdot [K\_220 + \\ K\_221 \cdot (\text{axis position } (A1)/\text{axis length } (A1)) ++ \\ K\_222 \cdot (\text{axis position } (A2)/\text{axis length } (A2))] \quad (18)$$

SIXTH EXAMPLE

In a sixth example, formulas will be stated for a structure comprising N axes A1 to AN serially based upon each other, wherein the temperature-dependent displacement is performed similarly to the fourth example described above, that is, the axis positions of the axis belonging to the respective difference in temperature and of all axes based upon this axis will respectively be taken into account in each summand of a compensation value for one of the axes A1 to AN.

In this connection, the formulas (19) to (23) describe the calculation of a compensation value $\Delta A1$ for the first linear axis A1, consisting of a sum of summands $\Delta A11$ to $\Delta A1N$ for each of the linear axes A1 to AN.

$$\Delta A11 = (T_{REFERENCE,1} - T_{BASE,1}) \cdot \\ [K\_110 + K\_111 \cdot (\text{axis position } (A1)/\text{axis length } (A1)) + \\ K\_112 \cdot (\text{axis position } (A2)/\text{axis length } (A2)) + \\ \ldots ++K\_11N \cdot (\text{axis position } (AN)/\text{axis length } (AN))] \quad (19)$$

$$\Delta A12 = (T_{REFERENCE,2} - T_{BASE,2}) \cdot \\ [K\_120 + K\_122 \cdot (\text{axis position } (A2)/\text{axis length } (A2)) + \\ \ldots ++K\_11N \cdot (\text{axis position } (AN)/\text{axis length } (AN))] \quad (20)$$

$$\Delta A1M = (T_{REFERENCE,M} - T_{BASE,M}) \cdot \\ [K\_1M0 + K\_1MM \cdot (\text{axis position } (AM)/\text{axis length } (AM)) + \\ \ldots ++K\_1MN \cdot (\text{axis position } (AN)/\text{axis length } (AN))] \quad (21)$$

$$\Delta A1N = (T_{REFERENCE,N} - T_{BASE,N}) \cdot \\ [K\_1N0 + K\_1NN \cdot (\text{axis position } (AN)/\text{axis length } (AN))] \quad (22)$$

$$\Delta A1 = \Delta A11 + \Delta A12 + \ldots + \Delta A1M + \ldots + \Delta A1N \quad (23)$$

The equations (24) to (28) describe the calculation of a compensation value $\Delta AN$ for an axis AN.

$$\Delta AN1 = (T_{REFERENCE,1} - T_{BASE,1}) \cdot \\ [K\_N10 + K\_N11 \cdot (\text{axis position } (A1)/\text{axis length } (A1)) ++ \\ K\_N12 \cdot (\text{axis position } (A2)/\text{axis length } (A2)) + \\ \ldots ++K\_N1N \cdot (\text{axis position } (AN)/\text{axis length } (AN))] \quad (24)$$

$$\Delta AN2 = (T_{REFERENCE,2} - T_{BASE,2}) \cdot \\ [K\_N20 + K\_N22 \cdot (\text{axis position } (A2)/\text{axis length } (A2)) + \\ \ldots ++K\_N1N \cdot (\text{axis position } (AN)/\text{axis length } (AN))] \quad (25)$$

$$\Delta ANM = (T_{REFERENCE,M} - T_{BASE,M}) \cdot \\ [K\_NM0 + K\_NMM \cdot (\text{axis position } (AM)/\text{axis length } (AM)) + \\ \ldots ++K\_NMN \cdot (\text{axis position } (AN)/\text{axis length } (AN))] \quad (26)$$

$$\Delta ANN = (T_{REFERENCE,N} - T_{BASE,N}) \cdot \\ [K\_NN0 + K\_NNN \cdot (\text{axis position } (AN)/\text{axis length } (AN))] \quad (27)$$

$$\Delta AN = \Delta AN1 + \Delta AN2 + \ldots + \Delta ANM + \ldots + \Delta ANN \quad (28)$$

SEVENTH EXAMPLE

In analogy to the fifth example of two linear axes A1 and A2 based upon each other, the following formulas indicate the formulas for the general situation of N linear axes A1 to AN linearly based upon each other.

In this connection, the formulas (29) to (33) describe the calculation of a compensation value $\Delta A1$ for the first linear axis A1. The formulas (34) to (38) describe the calculation of a compensation value $\Delta AN$ for the N-th linear axis AN. In this seventh example and in the preceding sixth example, the parameter M describes a natural number M with M>1 and M<N.

$$\Delta A11 = (T_{REFERENCE,1} - T_{BASE,1}) \cdot \\ [K\_110 + K\_111 \cdot (\text{axis position } (A1)/\text{axis length } (A1)) ++ \\ K\_112 \cdot (\text{axis position } (A2)/\text{axis length } (A2)) + \\ \ldots ++K\_11N \cdot (\text{axis position } (AN)/\text{axis length } (AN))] \quad (29)$$

$$\Delta A12 = (T_{REFERENCE,2} - T_{BASE,2}) \cdot \\ [K\_120 + K\_121 \cdot (\text{axis position } (A1)/\text{axis length } (A1)) ++ \\ K\_122 \cdot (\text{axis position } (A2)/\text{axis length } (A2)) + \\ \ldots ++K\_12N \cdot (\text{axis position } (AN)/\text{axis length } (AN))] \quad (30)$$

$$\Delta A1M = (T_{REFERENCE,M} - T_{BASE,M}) \cdot \\ [K\_1M0 + K\_1M1 \cdot (\text{axis position } (A1)/\text{axis length } (A1)) ++ \\ K\_1M2 \cdot (\text{axis position } (A2)/\text{axis length } (A2)) + \\ \ldots ++K\_1MN \cdot (\text{axis position } (AN)/\text{axis length } (AN))] \quad (31)$$

$$\Delta A1N = (T_{REFERENCE,N} - T_{BASE,N}) \cdot \\ [K\_1N0 + K\_1N1 \cdot (\text{axis position } (A1)/\text{axis length } (A1)) ++ \\ K\_1N2 \cdot (\text{axis position } (A2)/\text{axis length } (A2)) + \\ \ldots ++K\_1NN \cdot (\text{axis position } (AN)/\text{axis length } (AN))] \quad (32)$$

$$\Delta A1 = \Delta A11 + \Delta A12 + \ldots + \Delta A1M + \ldots + \Delta A1N \quad (33)$$

$$\Delta AN1 = (T_{REFERENCE,1} - T_{BASE,1}) \cdot \\ [K\_N10 + K\_N11 \cdot (\text{axis position } (A1)/\text{axis length } (A1)) ++ \\ K\_N12 \cdot (\text{axis position } (A2)/\text{axis length } (A2)) + \\ \ldots ++K\_N1N \cdot (\text{axis position } (AN)/\text{axis length } (AN))] \quad (34)$$

$$\Delta AN2 = (T_{REFERENCE,2} - T_{BASE,2}) \cdot \\ [K\_N20 + K\_N21 \cdot (\text{axis position } (A1)/\text{axis length } (A1)) ++ \\ K\_N22 \cdot (\text{axis position } (A2)/\text{axis length } (A2)) + \\ \ldots ++K\_N2N \cdot (\text{axis position } (AN)/\text{axis length } (AN))] \quad (35)$$

-continued $$\Delta A1M = (T_{REFERENCE,M} - T_{BASE,M}) \cdot \quad (36)$$
$$[K\_NM0 + K\_NM1 \cdot (\text{axis position } (A1)/\text{axis length } (A1)) ++$$
$$K\_NM2 \cdot (\text{axis position } (A2)/\text{axis length } (A2)) +$$
$$\ldots ++ K\_NMN \cdot (\text{axis position } (AN)/\text{axis length } (AN))]$$

$$\Delta A1N = (T_{REFERENCE,N} - T_{BASE,N}) \cdot \quad (37)$$
$$[K\_NN0 + K\_NN1 \cdot (\text{axis position } (A1)/\text{axis length } (A1)) ++$$
$$K\_NN2 \cdot (\text{axis position } (A2)/\text{axis length } (A2)) +$$
$$\ldots ++ K\_NNN \cdot (\text{axis position } (AN)/\text{axis length } (AN))]$$

$$\Delta AN = \Delta AN1 + \Delta AN2 + \ldots + \Delta ANM + \ldots + \Delta ANN \quad (38)$$

EIGHTH EXAMPLE

Figure 5:
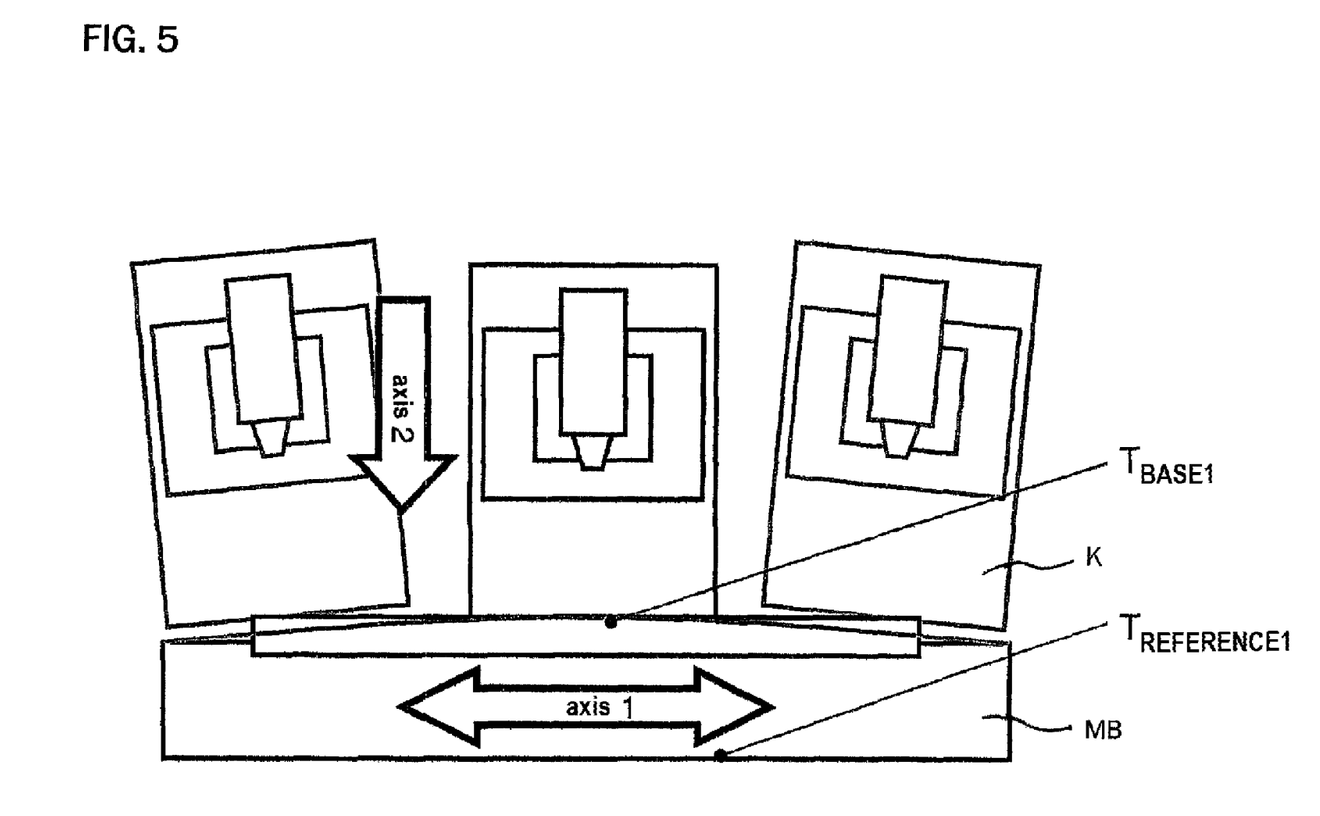
FIG. 5 exemplarily shows the temperature-dependent deformation of a machine bed of a machine tool in case of inhomogeneous heating.

On the basis of an eighth example, a modified calculation of a compensation value is described for a case as shown, for example, in FIG. 5 in which an axis is not formed by a linear axis having a projection on one side, but, e.g., like the axis A1 in FIG. 5 as a compound slide K displaceable on a machine bed MB.

In this connection, when calculating one or more of the compensation values, it is suggested due to the changed position dependency of the thermal displacement according to the eighth example to further take into account a correction factor for the changed position dependency in the calculation of the compensation values, for example, according to the correction factor KFA1 as stated in equation (41).

In this case, at least one compensation value summand directly proportional to the linear axis disposed on the machine bed MB is multiplied by the correction factor KFA1.

Furthermore, the correction factor KFA is inserted for the respective linear axis, here, e.g., KFA1 for the first linear axis A1, and in some preferred examples also for the respective position dependency normalized by the respective compensation factor, here, e.g., K_111 and K_M11, instead of the ratio of the axis position to the axis length.

$$\Delta A11 = (T_{REFERENCE,1} - T_{BASE,1}) \cdot \quad (40)$$
$$[K\_110 + K\_111 \cdot KFA1 ++ K\_112 \cdot (\text{axis position}$$
$$(A2)/\text{axis length } (A2)) + \ldots ++ K\_11N \cdot$$
$$(\text{axis position } (AN)/\text{axis length } (AN))] \cdot KFA1$$

$$\Delta A1M = (T_{REFERENCE,M} - T_{BASE,M}) \cdot [K\_M10 + K\_M11 \cdot KFA1 ++ \quad (40)$$
$$K\_M12 \cdot (\text{axis position } (A2)/\text{axis length } (A2)) + \ldots ++$$
$$K\_M1N \cdot (\text{axis position } (AN)/\text{axis length } (AN))]$$

$$KFA1 = \quad (41)$$
$$(\text{axis position } (A1) - (\text{axis length } (A1)/2))/(\text{axis length } (A1)/2)$$

Thus, the disclosed compensation of a temperature-dependent displacement may advantageously also be used for structures in which a compound slide displaceable on a machine bed, for example, is used for an axis.

Figure 6:
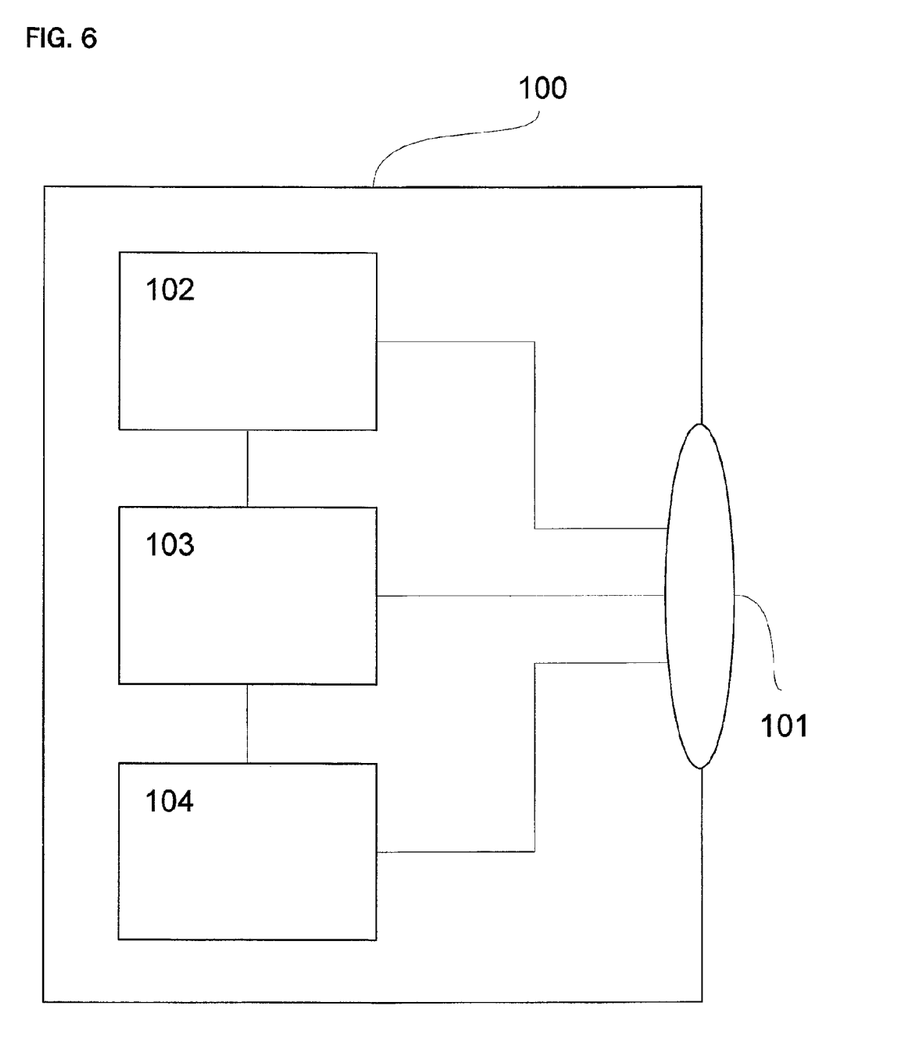
FIG. 6 schematically shows a device for compensating a temperature-dependent change of position on a machine tool according to examples disclosed herein.

FIG. 6 schematically shows an example device 100 for compensating a temperature-dependent change of position on a machine tool according to examples disclosed herein. The device 100 for compensating a temperature-dependent change of position on a machine tool having one or more linear axes comprises an interface 101 to one or more temperature detecting means for detecting temperatures at particular temperature measuring positions, linear axes of the machine tool and to a machine controller of the machine tool (e.g. the machine NC or machine PLC), difference in temperature obtaining means 102 for obtaining a first difference in temperature between a first reference temperature and the first temperature, compensation value determining means 103 for determining one or more compensation values in dependence of the differences in temperature obtained by the difference in temperature obtaining means 102, and change of position compensating means 104 for compensating a temperature-dependent change of position in dependence of the compensation values. In this connection, the change of position compensating means 104 is further adapted to determine one or more of the compensation values further in dependence of one or more axis positions of the linear axes. It is also possible to read out, e.g., axis positions via the interface. The device 100 is adapted, for example, to perform a compensation of temperature-dependent shifts on a machine tool according to one or more of the above-described examples.

In summary, the disclosed examples may be used to determine and/or implement a correlative compensation of the thermally caused shifts at the tool or workpiece of machine tools, which are caused due to the deformations of the frame components of a machine tool because of non-uniform heating as a consequence of one-sided heat-input, for example by guides and drives and also other effects. Here, in order to determine a compensation value, the ratio of axis position to axis length is preferably used which is used to calculate a position-dependent portion of the compensation value. To this end, this position-dependent portion is in some examples preferably also determined for directions perpendicular to the direction of movement of a linear axis. For machine tools having serial kinematics in which a plurality of axes are serially based upon each other, it is preferred in some examples to use the ratio of axis position to axis length of all axes for determining portions of the compensation values for all spatial directions. The compensation values for compensating the thermally caused deformations by the non-uniform heating of the machine frame components are optionally superimposed by further compensation portions, for example, also for compensating shifts due to rotary axes, such as, for example, a motor spindle.

The calculation of the compensation values is in some examples preferably performed with a timing cycle as fast as possible, for example, in the control unit, that is, the machine NC or the machine PLC of the machine tool. The compensation values calculated in dependence of the position will then be in some examples preferably superimposed to the respective axis target values of the axes by the machine NC or the axis target values are corrected on the basis of the calculated compensation values.

Thus, examples disclosed herein provide example methods, in which a compensation of thermal shifts on a machine tool can be compensated better than in the prior art because additionally to one or more differences in temperature on components of one or more axes of the machine tool, one or more axis positions of the axes of the machine tool are additionally taken into account in the calculation of compensation values and the temperature compensation is thus performed depending on the position in an advantageous manner.

Although certain methods, apparatus, systems, and articles of manufacture have been disclosed herein, the scope of coverage of this patent is not limited thereto. To the contrary, this patent covers all methods, apparatus, systems, and articles of manufacture fairly falling within the scope of the claims either literally or under the doctrine of equivalents.

What is claimed is:

1. A method for compensating a temperature-dependent change of position on a machine tool having at least one first linear axis, comprising:

detecting at least one first temperature at a first temperature measuring position of the first linear axis of the machine tool, obtaining a first difference in temperature between a first reference temperature and the first temperature, determining a first compensation value based on the first difference in temperature, and compensating a temperature-dependent change of position based on the first compensation value, the first compensation value is additionally determined based on an axis position of the first linear axis.

2. The method according to claim 1, wherein the first compensation value comprises a position-independent portion and a position-dependent portion depending at least on the axis position of the first linear axis.

3. The method according to claim 1, wherein the first compensation value is determined based on a ratio of the axis position of the first linear axis to an axis length of the first linear axis.

4. The method according to claim 1, wherein the first compensation value is determined based on a square of a ratio of the axis position of the first linear axis to an axis length of the first linear axis.

5. The method according to claim 1, wherein during the compensating of the temperature-dependent change of position based on the first compensation value the temperature-dependent change of position is compensated in a direction perpendicular to a direction of the first linear axis.

6. The method according to claim 1, wherein during the compensating of the temperature-dependent change of position based on the first compensation value the temperature-dependent change of position is compensated in a direction of a second linear axis of the machine tool.

7. The method according to claim 1, wherein the compensating of the temperature-dependent change of position further comprises adapting a first axis target position value of a second linear axis of the machine tool based on the first compensation value, the adapting of the first axis target position of the second linear axis being performed based on the axis position of the first linear axis.

8. The method according to claim 1, further comprising:
detecting at least a second temperature at a third temperature measuring position of a second linear axis of the machine tool, obtaining a second difference in temperature between a second reference temperature and the second temperature, and determining a second compensation value based on the second difference in temperature, wherein the temperature-dependent change of position is compensated based on the first compensation value and of the second compensation value, and wherein the second compensation value is further determined based on an axis position of the second linear axis.

9. The method according to claim 8, wherein the compensating of the temperature-dependent change of position further comprises adapting a first axis target position value of the second linear axis of the machine tool based on the first compensation value and adapting a second axis target position value of the first linear axis of the machine tool based on the second compensation value, the adapting of the axis target position of the second linear axis being performed based on the axis position of the first linear axis and the adapting of the axis target position of the first linear axis being performed based on the axis position of the second linear axis.

10. The method according to claim 8, wherein at least one of the first reference temperature is a temperature measured at a second temperature measuring position of the first linear axis or the second reference temperature is a temperature measured at a fourth temperature measuring position of the second linear axis.

11. The method according to claim 8, wherein the second reference temperature is at least one of equal to the first reference temperature, particularly equal to a reference temperature detected at a reference temperature measuring position of the machine tool or equal to a reference temperature dependent on the ambient temperature of the machine tool.

12. The method according to claim 8, wherein the first and second linear axes of the machine tool are realized as two axes serially based upon each other including a projection on one side, the second linear axis being based upon the first linear axis and the first compensation value being further determined based on an axis position of the second linear axis.

13. The method according to claim 12, wherein the second compensation value is further determined based on an axis position of the first linear axis.

14. The method according to claim 8, further comprising:
determining a third compensation value based on the first difference in temperature, and determining a fourth compensation value based on the second difference in temperature, wherein the temperature-dependent change of position is compensated in a direction of the first linear axis based on the third compensation value and the second compensation value and the temperature-dependent change of position is compensated in a direction of the second linear axis based on the first compensation value and the fourth compensation value, wherein the third compensation value is further determined based on the axis position of the first linear axis and the fourth compensation value is further determined based on the axis position of the second linear axis.

15. The method according to claim 14, wherein the compensating of the temperature-dependent change of position further comprises adapting a first axis target position value of the second linear axis of the machine tool based on the first compensation value and of the fourth compensation value, and adapting a second axis target position value of the first linear axis of the machine tool based on the third compensation value and of the second compensation value.

16. The method according to claim 1, wherein the machine tool comprises a plurality of linear axes serially based upon each other and including a projection, wherein for each of the plurality of linear axes at least one temperature is obtained at a temperature measuring position of the linear axis and a respective difference in temperature between a respective reference temperature and the respective obtained temperature is obtained, and for each of the linear axes a compensation total value is determined which corresponds to a sum of compensation values the number of which is equal to the number of linear axes serially based upon each other, wherein each compensation value is directly proportional to exactly one of the differences in temperature.

17. The method according to claim 16, wherein each compensation value is determined based on a sum of position-dependent terms, each position-dependent term depending on the axis position of one of the linear axes.

18. The method according to claim 17, wherein each of the position-dependent terms depends on the ratio of the axis position to the axis length of one of the linear axes.

19. The method according to claim 17, wherein each individual compensation value comprises a position-dependent term for the linear axis, to the difference in temperature of which the compensation value is directly proportional, and furthermore position-dependent terms at least for all preceding linear axes of the plurality of serially structured linear axes.

20. The method according to claim 1, wherein the first linear axis is a slide displaceable on a machine bed, wherein in the step of determining the first compensation value, a factor $$(AP1-AL1/2)/(AL1/2)$$

is further taken into account wherein AP1 is the axis position of the first linear axis and AL1 is the axis length of the first linear axis.

21. The method according to claim 1, wherein the determining of one or more compensation values is executed in a position controller of a numerical control device of the machine tool or in a programmable logic controller of the machine tool.

22. The method according to claim 21, wherein the compensating of a temperature-dependent change of position based on the one or more compensation values is executed in the numerical control device of the machine tool.

23. A device for compensating a temperature-dependent change of position on a machine tool having at least one first linear axis, comprising:
  a first temperature detecting means to detect at least one first temperature at a first temperature measuring position of the first linear axis of the machine tool,
  a difference in temperature obtainer to obtain a first difference in temperature between a first reference temperature and the first temperature,
  a compensation value determiner to determine a first compensation value based on the first difference in temperature, and
  a change of position compensator to compensate a temperature-dependent change of position based on the first compensation value, the change of position compensator adapted to determine the first compensation value additionally based on an axis position of the first linear axis.

24. The device according to claim 23, wherein the change of position compensator further comprises an axis target position adaptor to adapt a first axis target position value of a second linear axis of the machine tool based on the first compensation value, the axis target position adaptor being adapted to perform the adapting of the axis target position of the second linear axis based on the axis position of the first linear axis.

25. The device according to claim 23, further comprising:
  a second temperature detector to detect at least one second temperature at a third temperature measuring position of a second linear axis of the machine tool, wherein
  the difference in temperature obtainer is further set up to obtain a second difference in temperature between a second reference temperature and the second temperature, and the change of position compensator is further set up to determine a second compensation value based on the second difference in temperature, and
  a temperature-dependent change of position is compensated based on the first compensation value and the second compensation value, and the second compensation value is further determined based on an axis position of the second linear axis.

26. The device according to claim 23, further comprising at least one of a third temperature detector to detect the first reference temperature at a second temperature measuring position of the first linear axis or a fourth temperature detector to detect the second reference temperature at a fourth temperature measuring position of the first linear axis.

27. The device according to claim 23, wherein the compensation value determiner to determine one or more compensation values is comprised in a position controller of a numerical control device of the machine tool or in a programmable logic controller of the machine tool.

28. The device according to claim 27, wherein the change of position compensator to compensate a temperature-dependent change of position based on the one or more compensation values is comprised in the numerical control device of the machine tool.

29. A system comprising the machine tool having the at least one first linear axis and a device to compensate the temperature-dependent change of position on the machine tool in accordance with the method of claim 1.

* * * * *